United States Patent
Tsukamoto et al.

(10) Patent No.: US 7,440,840 B2
(45) Date of Patent: Oct. 21, 2008

(54) ECOLOGICAL DRIVING SYSTEM

(75) Inventors: Akira Tsukamoto, Kariya (JP); Nobutaka Tauchi, Toyoake (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 11/526,807

(22) Filed: Sep. 25, 2006

(65) Prior Publication Data

US 2007/0073468 A1 Mar. 29, 2007

(30) Foreign Application Priority Data

Sep. 27, 2005 (JP) ............... 2005-280249
Apr. 5, 2006 (JP) ............... 2006-104136

(51) Int. Cl.
*G06F 19/00* (2006.01)
*G06G 7/70* (2006.01)

(52) U.S. Cl. ............ 701/110; 701/104; 701/115; 702/182

(58) Field of Classification Search ............ 701/110, 701/112, 115, 101–105, 113, 114; 702/182–188
See application file for complete search history.

(56) References Cited

U.S. PATENT DOCUMENTS

| | | | |
|---|---|---|---|
| 6,975,217 B2 | 12/2005 | ENdoh | |
| 7,130,766 B2* | 10/2006 | Tanase | 702/182 |
| 2002/0062191 A1 | 5/2002 | Yanagisawa | |
| 2003/0171851 A1* | 9/2003 | Brickfield et al. | 700/286 |
| 2005/0021191 A1* | 1/2005 | Taniguchi et al. | 701/1 |

FOREIGN PATENT DOCUMENTS

| | | |
|---|---|---|
| JP | 59-103940 | 6/1984 |
| JP | 04-366729 | 12/1992 |
| JP | 2000-205030 | 7/2000 |
| JP | 2000-247162 | 9/2000 |
| JP | 2001-250139 | 9/2001 |
| JP | 2002-323902 | 11/2002 |

* cited by examiner

*Primary Examiner*—Willis R. Wolfe, Jr.
*Assistant Examiner*—Johnny H. Hoang
(74) *Attorney, Agent, or Firm*—Harness, Dickey & Pierce, PLC

(57) ABSTRACT

There is a need for making a user fully conscious about environmentally friendly driving. In an ecological driving system, a CPU allows a display apparatus to distinctively display fuel consumption according to the following idling states. One idling state results from engine warm-up. Another is useless idling state. Still another idling state results when a vehicle waits for turning to the left at an intersection or stops at a roadside. Yet another idling state results when the vehicle waits for turning to the right at an intersection. Still yet another idling state results when the vehicle waits forward at an intersection or stops due to traffic congestion.

25 Claims, 9 Drawing Sheets

$$V_{OUT}(t2) - V_{OUT}(t1)$$

FIG. 7

$$\int_{t1}^{t2} V_{IN} \times I_{IN}\, dt - \int_{t1}^{t2} V_{OUT} \times I_{OUT}\, dt$$

ECOLOGICAL DRIVING SYSTEM

CROSS REFERENCE TO RELATED APPLICATION

This application is based on and incorporates herein by reference Japanese Patent Applications No. 2005-280249 filed on Sep. 27, 2005, and No. 2006-104136 filed on Apr. 5, 2006.

FIELD OF THE INVENTION

The invention relates to an ecological driving system that prompts a user to do environmentally friendly driving.

BACKGROUND OF THE INVENTION

For prompting a user to practice environmentally friendly driving, an example system evaluates user's driving situations and notifies the user of an evaluation result (e.g., see patent document 1).

Patent document: JP-2002-104023A (US2002/0062191 A1)

This type of system for prompting the user to do environmentally friendly driving determines simply whether or not an engine is idle. For instance, the system notifies the user of such information that the engine is idling too long. When the system only determines whether or not the engine is idling, the user can be simply notified of this information but cannot be easily notified whether or not the user is responsible for the idling state. For example, the user may not be able to easily prevent an idling state, for which the user is not directly responsible, when the engine is idling because his or her vehicle waits for the traffic light to change at an intersection or temporarily stops due to traffic congestion. In contrast, the user may be able to stop an idling state, for which the user is directly responsible, when the engine is idling uselessly. Accordingly, the above system does not allow the user to be fully conscious of environmentally friendly driving.

SUMMARY OF THE INVENTION

The present invention has been made in consideration of the foregoing. It is therefore an object of the present invention to provide an ecological driving system that allows a user to be conscious of environmentally friendly driving.

According to an aspect of the present invention, an ecological driving system in a vehicle is provided as follows. State detecting means detects states including a first state and a second state of the vehicle. Computing means computes (i) first data on a fuel consumption in the first state and (ii) second data on a fuel consumption in the second state. Reporting means reports the first data and the second data, mutually distinctively.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
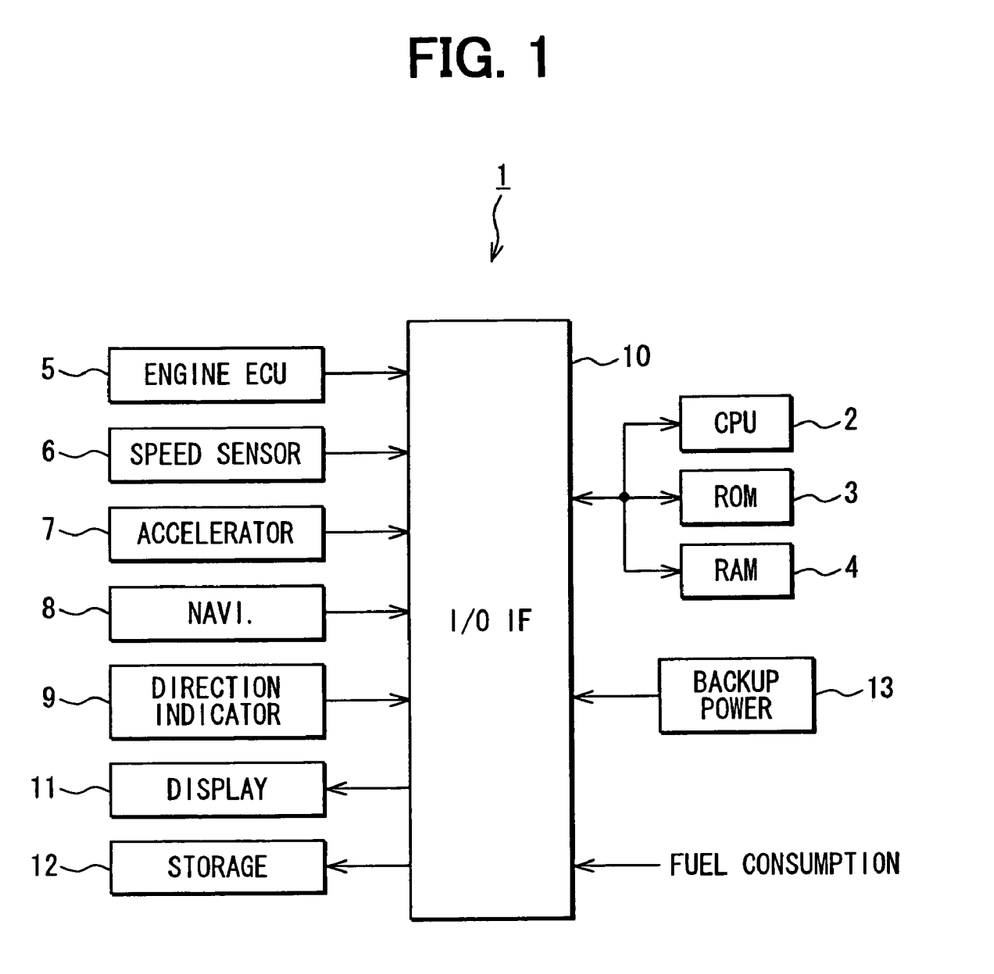
FIG. 1 is a functional block diagram showing a first embodiment of the present invention.

With reference to FIGS. 1 through 4, the following describes a first embodiment of the present invention applied to a vehicle that uses, as a single driving source, liquid fuel such as gasoline. FIG. 1 is a functional block diagram showing an overall construction of an ecological driving system 1 provided in the vehicle. In the ecological driving system 1, a CPU 2 (functioning as control means) reads and executes a control program stored in a ROM 3. In addition, the CPU 2 uses a RAM 4 as a work storage to control overall operations of the ecological driving system 1.

An engine ECU (Electronic Control Unit) 5 outputs an engine state signal indicating whether an engine is operating, stops, or warms up to increase the engine temperature. A vehicle speed sensor 6 outputs a vehicle speed signal indicating the vehicle speed. An accelerator 7 outputs an accelerator opening signal indicating the accelerator opening. A navigation apparatus 8 functioning as navigating means outputs a driving state signal indicating whether or not the vehicle is positioned on a road. The driving state signal also indicates the vehicle's driving state, i.e., whether or not the vehicle waits for the traffic light to change at an intersection. A direction indicator 9 outputs a direction indication signal representing the state of direction indication.

The CPU 2 is supplied with various signals via an input/output interface 10 from the engine ECU 5, the vehicle speed sensor 6, the accelerator 7, the navigation apparatus 8, and the direction indicator 9. The CPU 2 analyzes the supplied signals to identify states of the engine and the vehicle. Thus, the CPU 2 functions as state detecting means. The CPU 2 outputs a display instruction signal to a display apparatus 11 via the input/output interface 10 to allow the display apparatus 11 to display various display information. Thus, the CPU 2 along with the display apparatus 11 functions as reporting means. In addition, the CPU 2 outputs a storage instruction signal to a storage apparatus 12 via the input/output interface 10 to allow the storage apparatus 12 to store various information. Further, the CPU 2 is supplied with the liquid fuel consumption via the input/output interface 10 from the outside, and functions as computing means to compute various data on fuel consumption with respect to various states. According to the above-mentioned construction, a backup power supply 13 supplies backup power to each of the components via the input/output interface 10. The CPU 2 and the display apparatus 11 may be built into the navigation apparatus 8.

Figure 2:
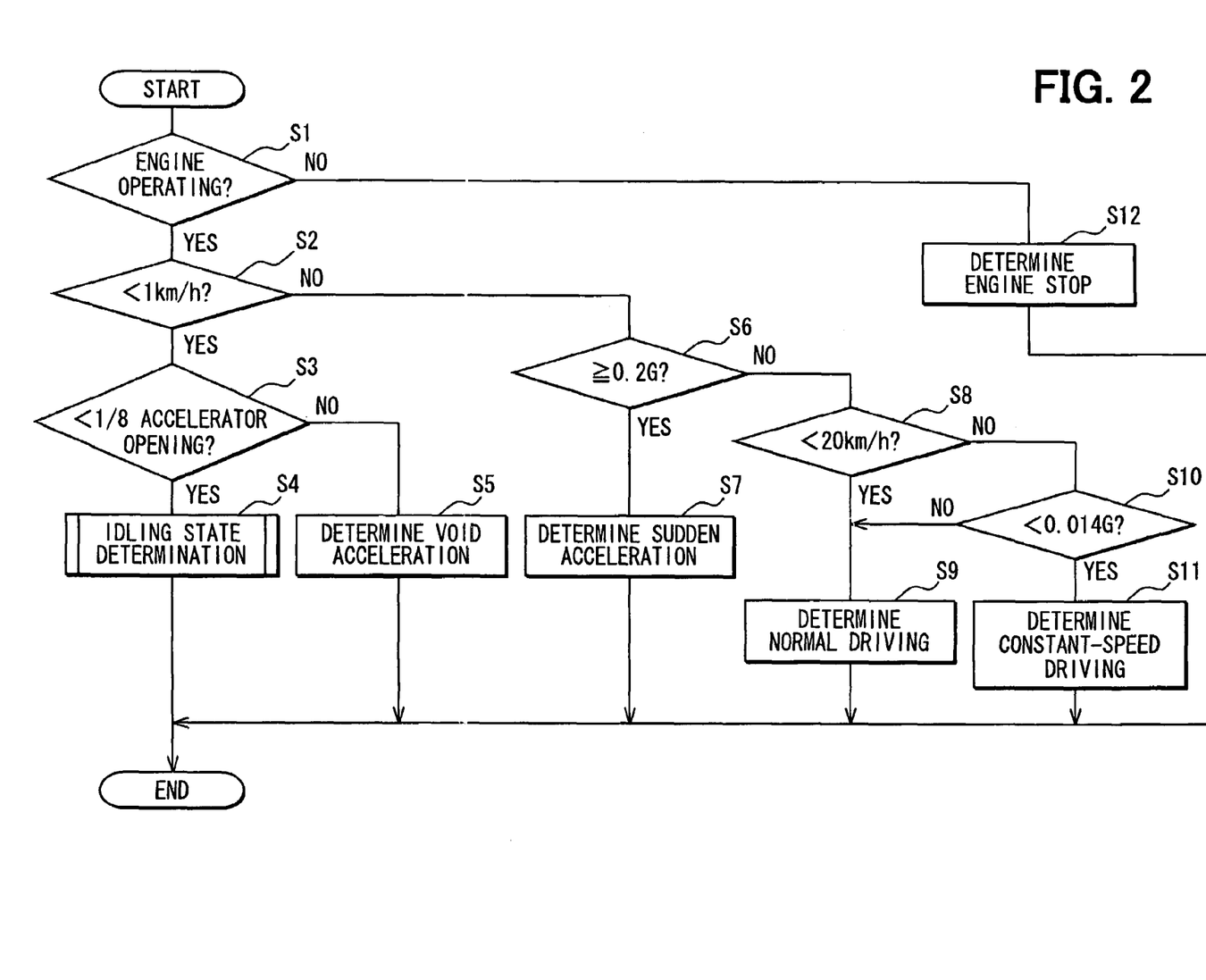
FIG. 2 is a flowchart diagram of part of a state determination process performed by a CPU according to the first embodiment.
Figure 3:
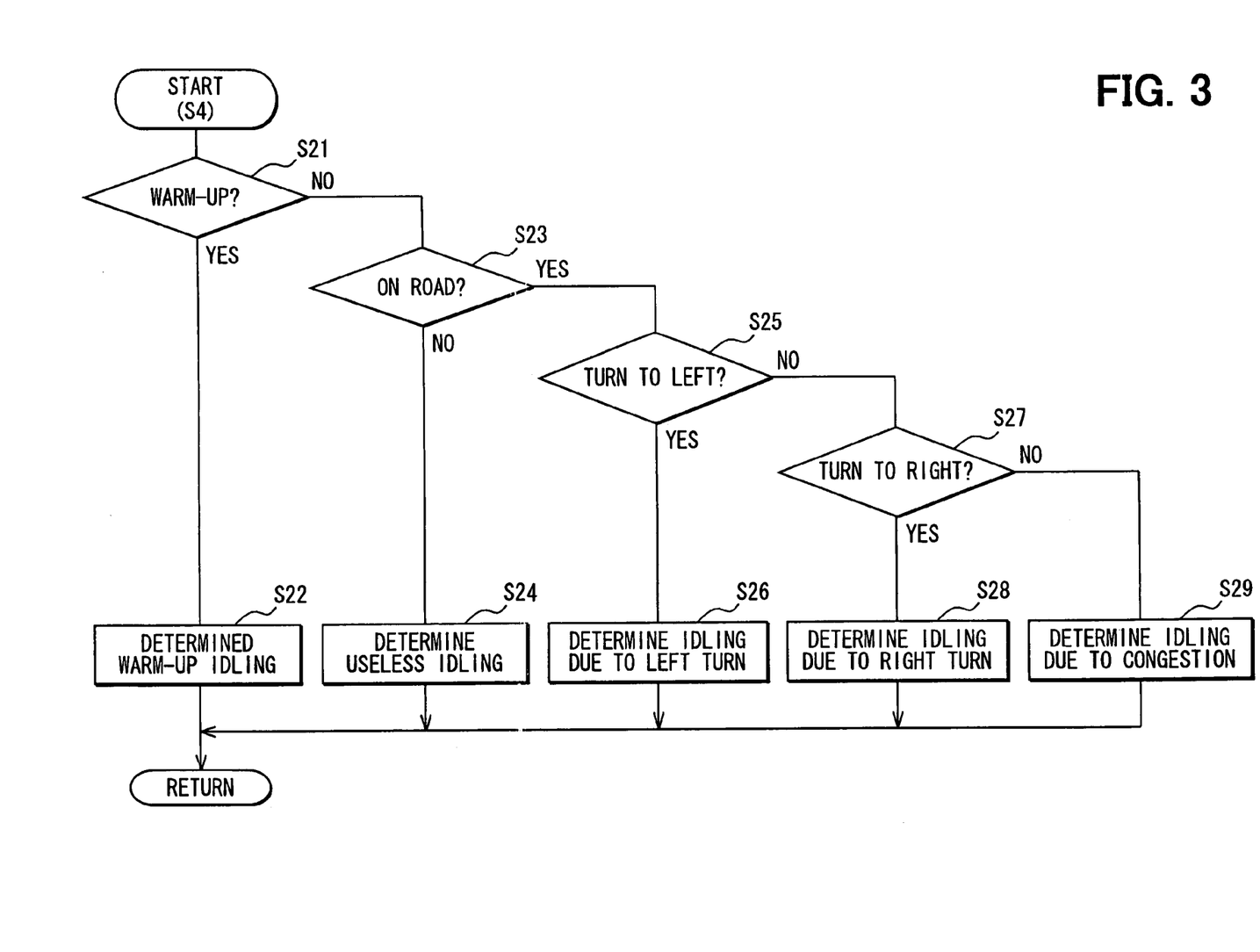
FIG. 3 is a flowchart diagram of part of the state determination process performed by the CPU according to the first embodiment.

Operations of the above-mentioned construction will de described with reference to FIGS. 2, 3, 4A, 4B, and 4C. FIGS. 2 and 3 are flowcharts showing a state determination process performed by the CPU 2. When an engine is operating, the CPU 2 performs the state determination process periodically (e.g., every minute). The CPU 2 checks an engine state signal from the engine ECU 5 to determine whether or not the engine is operating (Step S1). The CPU 2 may detect that the engine is operating (YES at Step S1). In this case, the CPU 2 checks a vehicle speed signal from the vehicle speed sensor 6 to determine whether or not the vehicle speed is lower than 1 km/h (Step S2).

The CPU 2 may detect that the vehicle speed is lower than 1 km/h (YES at Step S2). In this case, the CPU 2 checks an accelerator opening signal from the accelerator 7 to determine whether or not the accelerator opening is less than 1/8 (Step S3). The CPU 2 may detect that the accelerator opening is less than 1/8 (YES at Step S3). In this case, the CPU 2 proceeds to a detailed idling state determination process (Step S4).

In the detailed idling state determination process, the CPU 2 checks the engine state signal from the engine ECU 5 to determine whether or not the engine is warming up (Step S21). The CPU 2 may detect that the engine is warming up (YES at Step S21). In this case, the CPU 2 determines that the idling state results from the engine warm-up (Step S22).

The CPU 2 may detect that the engine does not warm up (NO at Step S21). In this case, the CPU 2 checks a driving state signal from the navigation apparatus 8 to determine whether or not the vehicle is positioned on a road (Step S23). The CPU 2 may detect that the vehicle is not positioned on the road (NO at Step S23). For example, the vehicle may be positioned at a driver's own garage or a public parking area. In this case, the CPU 2 determines that the idling state is wasteful or useless (Step S24).

The CPU 2 may detect that the vehicle is positioned on the road (YES at Step S23). In this case, the CPU 2 checks a direction indication signal from the direction indicator 9 to determine whether or not the direction indicator indicates turning to the left. In addition, the CPU 2 checks a driving state signal from the navigation apparatus 8 to determine whether or not the navigation system generates the guidance to turn to the left (Step S25). The CPU 2 may detect that the direction indicator indicates turning to the left or the navigation system generates the guidance to turn to the left (YES at Step S25). In this cases the CPU 2 determines that the idling state occurs because the vehicle waits for turning to the left at an intersection or stops at the roadside (Step S26). Here, it is assumed that this embodiment takes place in a left-hand traffic system seen, e.g., in Japan or Britain.

The CPU 2 checks a direction indication signal from the direction indicator 9 to determine whether or not the direction indicator indicates turning to the right. In addition, the CPU 2 checks a driving state signal from the navigation apparatus 8 to determine whether or not the navigation system generates the guidance to turn to the right (Step S27). The CPU 2 may detect that the direction indicator indicates turning to the right or the navigation system generates the guidance to turn to the right (YES at Step S27). In this case, the CPU 2 determines that the idling state occurs because the vehicle waits for turning to the right at an intersection (Step S28). By contrast, the CPU 2 may detect that the direction indicator does not indicate turning to the left (NO at Step S25). In addition, the CPU 2 may detect that the direction indicator does not indicate turning to the right and the navigation system does not generate the guidance to turn to the right (NO at Step S27). In this case, the CPU 2 determines that the idling state occurs because the vehicle waits forward at an intersection or stops due to traffic congestion (Step S29).

According to the above-mentioned process, the CPU 2 distinguishes the following idling states from each other. One idling state results from the engine warm-up. Another is unnecessary or useless idling state. Still another idling state results when the vehicle waits for turning to the left at an intersection or stops at the roadside. Yet another idling state results when the vehicle waits for turning to the right at an intersection. Still yet another idling state results when the vehicle waits forward at an intersection or stops due to traffic congestion. Of these, a user is responsible for the unnecessary idling state and can prevent it depending on his or her effort. By contrast, the user is not responsible for the following group of idling states and cannot easily prevent them despite his or her effort: the idling state occurring when the vehicle waits for turning to the left at an intersection or stops at the roadside; the idling state occurring when the vehicle waits for turning to the right at an intersection; and the idling state occurring when the vehicle waits forward at an intersection or stops due to traffic congestion. In other words, the above group of idling states results from temporary stopping during vehicle travel. Assume that this group of idling states resulting from temporary stopping during vehicle travel consumes significant fuel and a user is notified of this fact. This may provide an opportunity or motivation for the user to re-consider another alternative route or manner for possibly saving fuel.

The CPU 2 may detect that the engine is operating, the vehicle speed is lower than 1 km/h, and the accelerator opening is not less than 1/8 (NO at Step S3). In this case, the CPU 2 determines a void acceleration state (e.g., where the accelerator is opened with the vehicle speed not increased) where the accelerator is opened not less than 1/8 with the vehicle speed lower than 1 km/h (Step S5). When detecting that the engine is operating and the vehicle speed is higher than or equal to 1 km/h (NO at Step S2), the CPU 2 determines whether or not the acceleration is greater than or equal to 0.2 G (Step S6). When detecting that the acceleration is greater than or equal to 0.2 G (YES at Step S6), the CPU 2 determines a sudden acceleration state where the vehicle accelerates suddenly (Step S7).

When detecting that the acceleration is less than 0.2 G (NO at Step S6), the CPU 2 determines whether or not the vehicle speed is lower than 20 km/h (Step S8). When detecting that the vehicle speed is lower than 20 km/h (YES at Step S8), the CPU 2 determines a normal driving state where the vehicle is in a normal driving state (Step S9). When detecting that the vehicle speed is higher than or equal to 20 km/h (NO at Step S8), the CPU 2 determines whether or not the acceleration is less than 0.014 G (Step S10). When detecting that the acceleration is less than 0.014 G (YES at Step S10), the CPU 2 determines a constant-speed driving state where the vehicle is in a constant-speed driving state (Step S11).

Further, when detecting that the engine is not operating (NO at Step S1), the CPU 2 determines that the engine stops (Step S12).

The CPU 2 accumulates the number of times the CPU 2 identifies each of the states as mentioned above until the fuel consumption reaches a specified amount. Here, each time a certain state is identified as a result of a certain one cycle of the state determination process, a fuel amount and a travel distance are obtained for the certain cycle. Thus, fuel consumptions and travel distances for each state can be accumulated until the fuel consumption reaches the specified amount.

Figure 4A:
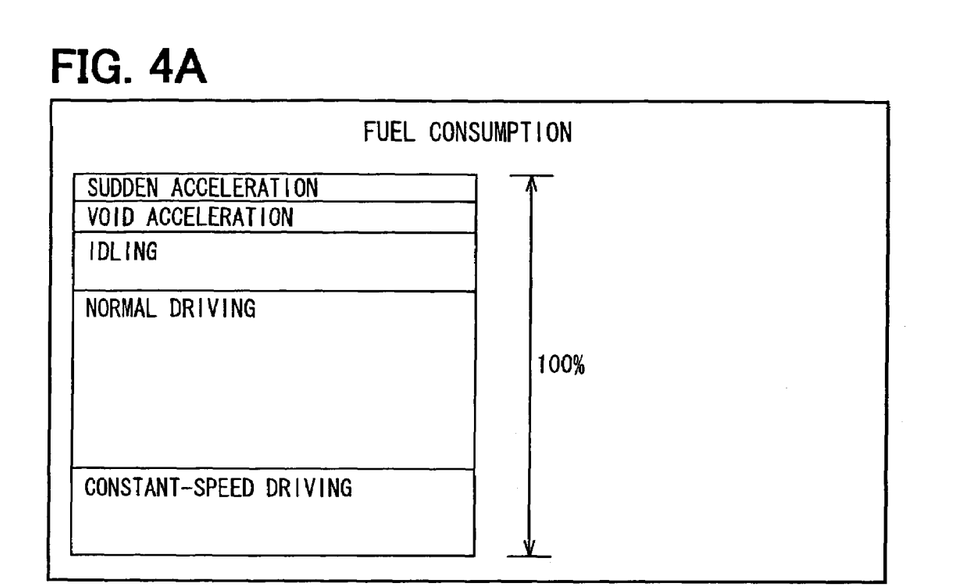
FIG. 4A shows a display screen example of illustrating fuel consumption for each vehicle state according to the first embodiment.
Figure 4B:
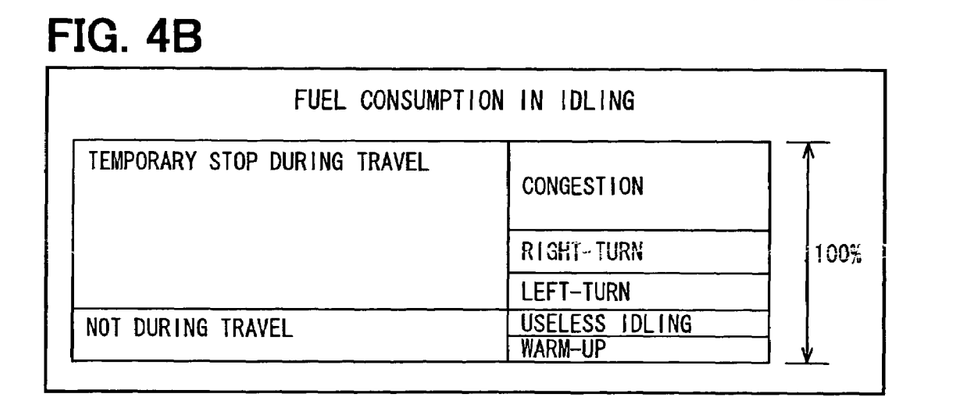
FIG. 4B shows a display screen example of illustrating fuel consumption in idling states according to the first embodiment.
Figure 4C:
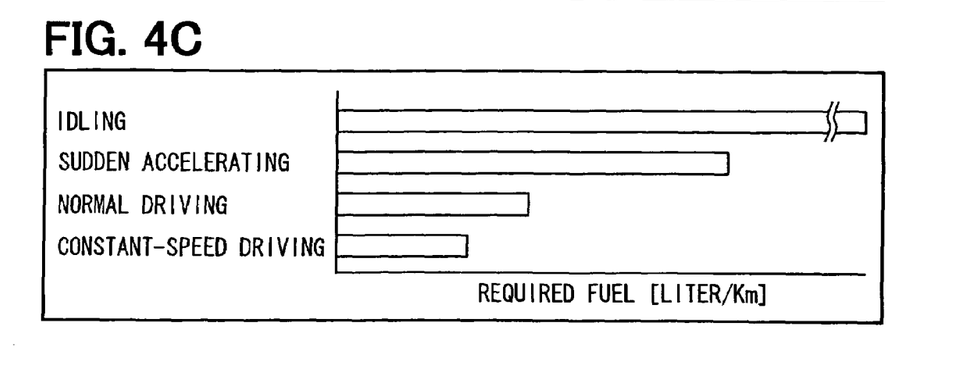
FIG. 4C shows a display screen example of illustrating required fuel for each vehicle state according to the first embodiment.
Figure 5:
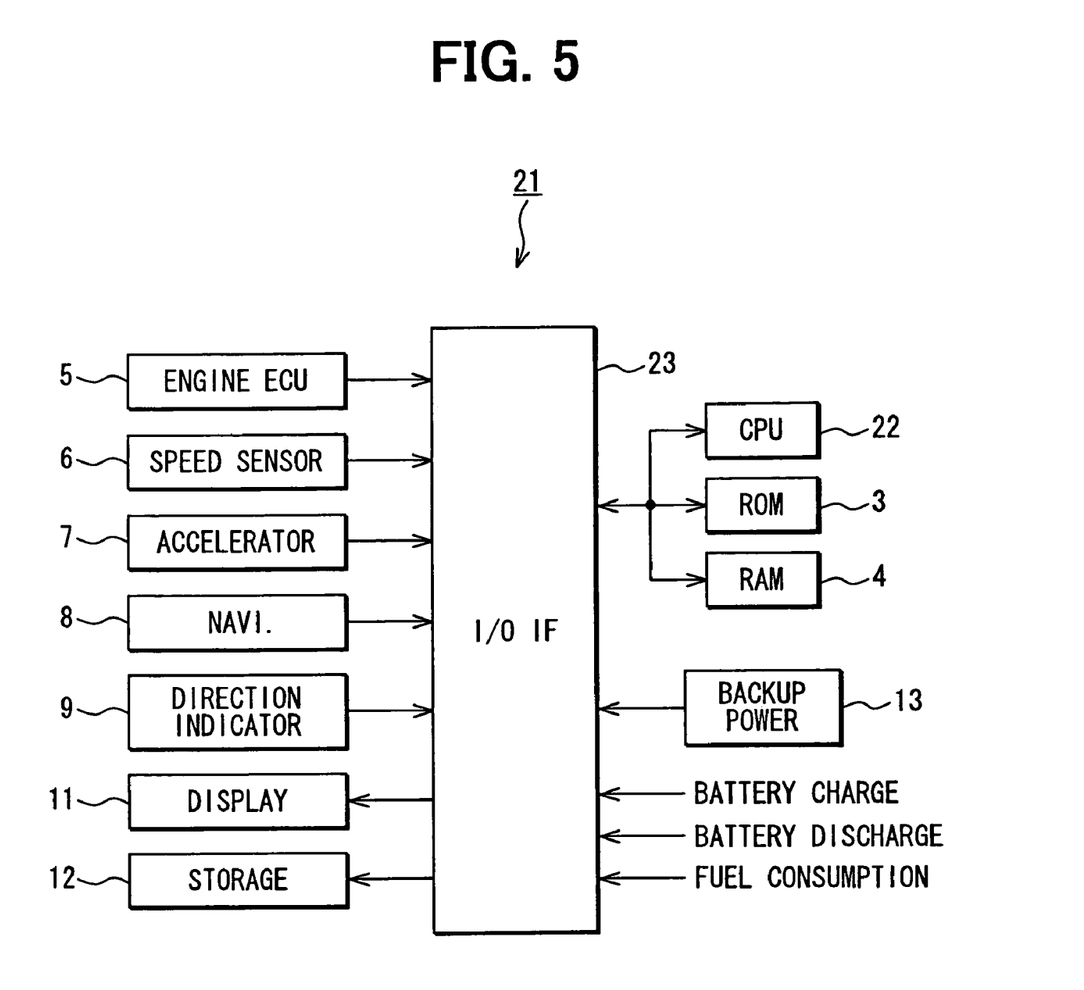
FIG. 5 is a functional block diagram showing a second embodiment of the present invention.

The CPU 2 then allows the display apparatus 11 to display a graph as shown in FIGS. 4A to 4C. FIG. 4A shows a display screen example of illustrating fuel consumption for each vehicle state. FIG. 4B shows a display screen example of illustrating fuel consumption in each idling state. FIG. 4C shows a display screen example of illustrating required fuel per unit distance for each vehicle state. As explained above, these figures may provide an opportunity or motivation for a user to re-consider another alternative (route, manner, time-frame, or the like) for possibly saving fuel.

For instance, the lowest row of the graph in FIG. 4A indicates the most environmentally friendly driving in which the vehicle drives at a constant speed. The highest row of the graph indicates the least environmentally friendly driving in which the vehicle accelerates suddenly. It may be preferable to use different colors corresponding to degrees of the environmentally friendly driving. For example, green can be used for the area corresponding to the constant-speed driving state. Blue may be used for the area corresponding to the normal driving state. Yellow may be used for the area corresponding to the idling. Orange may be used for the area corresponding to the void acceleration. Red may be used for the area corresponding to the sudden acceleration. Further, it may be preferable to accumulate the states in terms of points or levels. The accumulated points may be evaluated as "Excellent" or "Good", for example. In this manner, the user may be notified that the environmentally friendly driving has been achieved.

The user may specify beginning and end points corresponding to the time of supplying the liquid fuel, for example. When the liquid fuel is supplied, the CPU 2 may allow the display apparatus 11 to display the graph indicating the fuel consumption ratios or the like for the states detected from the beginning to end points specified by the user. The user may use the navigation apparatus 8 to set a destination. When the vehicle reaches the destination, the CPU 2 may allow the display apparatus 11 to display the graph indicating the fuel consumption ratios or the like for the states detected from a departure place to the destination.

As mentioned above, the ecological driving system 1 according to the first embodiment distinctively displays the liquid fuel consumption according to the following idling states. One idling state results from the engine warm-up. Another is unnecessary idling state. Still another idling state results when the vehicle waits for turning to the left at an intersection or stops at the roadside. Yet another idling state results when the vehicle waits for turning to the right at an intersection. Still yet another idling state results when the vehicle waits forward at an intersection or stops due to traffic congestion. The system can notify the user of the liquid fuel consumption distinctively in each of the idling states. The system notifies the user which idling state consumes the liquid fuel. In this manner, the system can sufficiently make the user conscious of the environmentally friendly driving.

Second Embodiment

With reference to FIGS. 5 through 10, the following describes a second embodiment of the invention. A description about the same part as the first embodiment is omitted and differences are described. The second embodiment is applied to a so-called hybrid vehicle that uses the liquid fuel and the electric power as a driving source. In an ecological driving system 21, a CPU 22 is supplied with the liquid fuel consumption from the outside via an input/output interface 23. In addition, the CPU 22 is supplied with the amount of battery charge and discharge via the input/output interface 23.

There are two methods of calculating the amount of battery charge and discharge. One is to measure the transition of output voltages from the battery. The other is to measure a difference between input power to the battery per unit time and output power from the battery per unit time.

Figure 6:
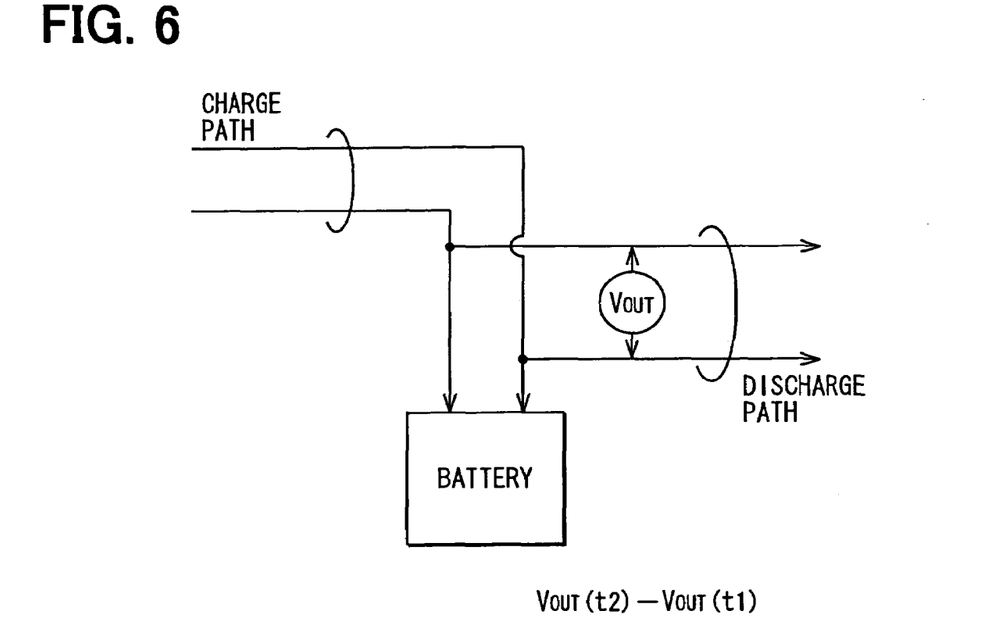
FIG. 6 shows a procedure of calculating an amount of charging and discharging a battery according to the second embodiment.
Figure 7:
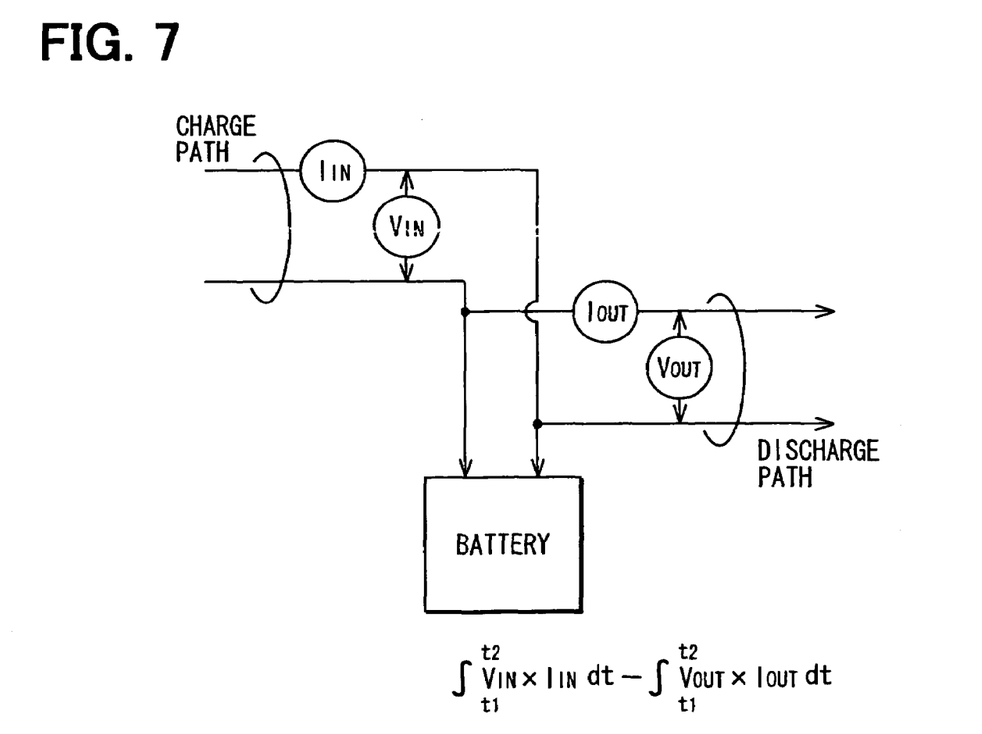
FIG. 7 shows another procedure of calculating an amount of charging and discharging a battery according to the second embodiment.

FIG. 6 shows the method of measuring the transition of output voltages from the battery. This method provides a discharge path with a voltage detector to measure output voltages from the battery. FIG. 7 shows a method of measuring a difference between input power to the battery per unit time and output power from the battery per unit time. This method provides each of the charge and discharge paths with the current and voltage detectors. This method measures input power to the battery per unit time and output power from the battery per unit time and detects a difference between them.

Figure 8:
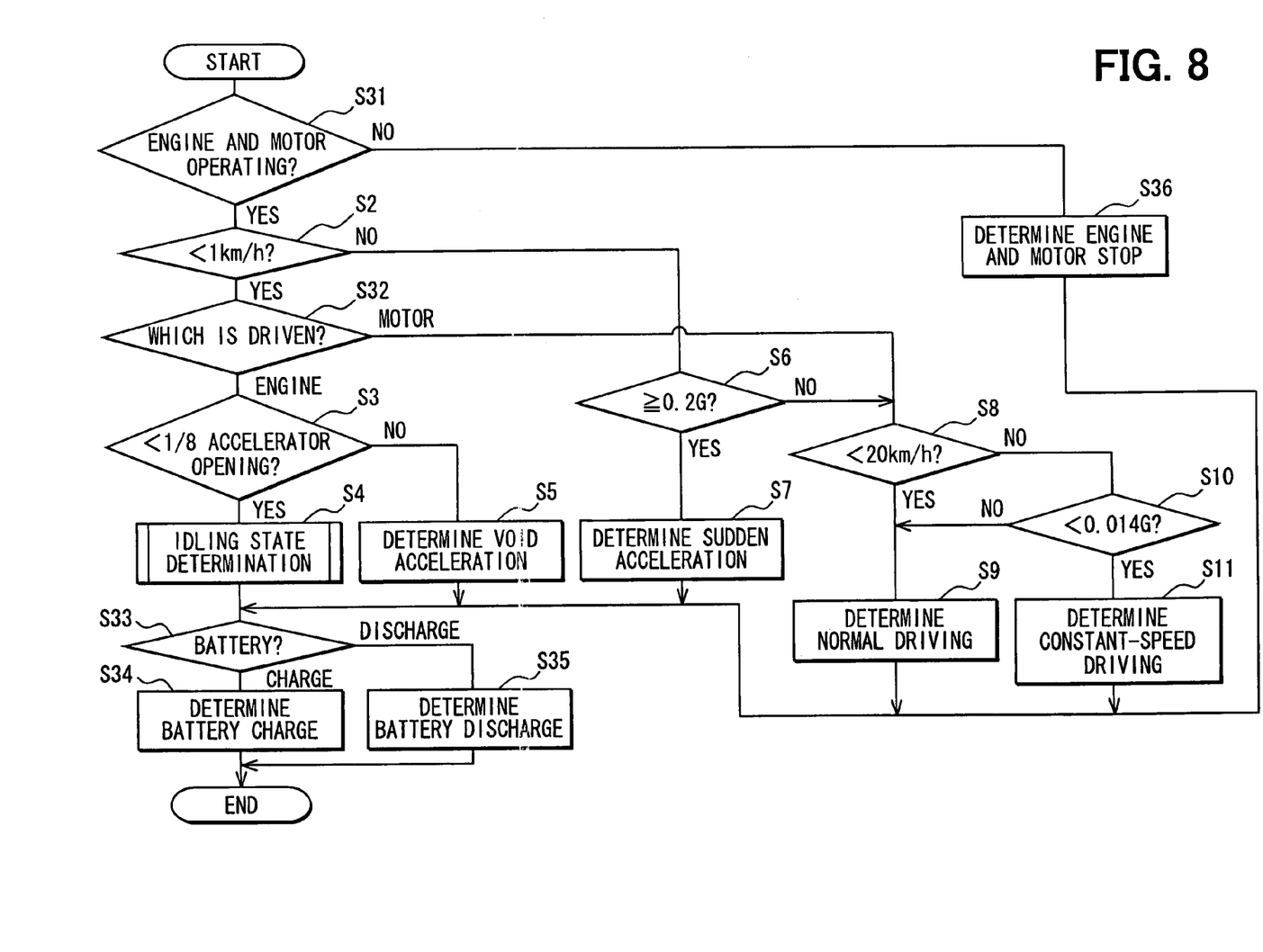
FIG. 8 is a flowchart diagram of part of a state determination process performed by a CPU according to the second embodiment.

FIG. 8 shows a flowchart performed by the CPU 22. When an engine is operating, the CPU 22 performs the following processes periodically (e.g., every minute). The CPU 22 determines whether or not the engine is operating (Step S31). The CPU 22 may detect that the engine and the motor are operating (YES at Step S31). The CPU 22 checks a vehicle speed signal from the vehicle speed sensor 6 to determine whether or not the vehicle speed is lower than 1 km/h (Step S2).

The CPU 22 may detect that the vehicle speed is lower than 1 km/h (YES at Step S2). In this case, the CPU 22 determines whether the engine or the motor is driven (Step S32). When detecting that the engine is driven, the CPU 22 checks an accelerator opening signal from the accelerator 7 to determine whether or not the accelerator opening is less than ⅛ (Step S3). The CPU 22 may detect that the accelerator opening is less than ⅛ (YES at Step S3). Thereafter, control proceeds to the detailed idling state determination process as described in the first embodiment (Step S4) to perform Steps S21 through S29.

Figure 9:
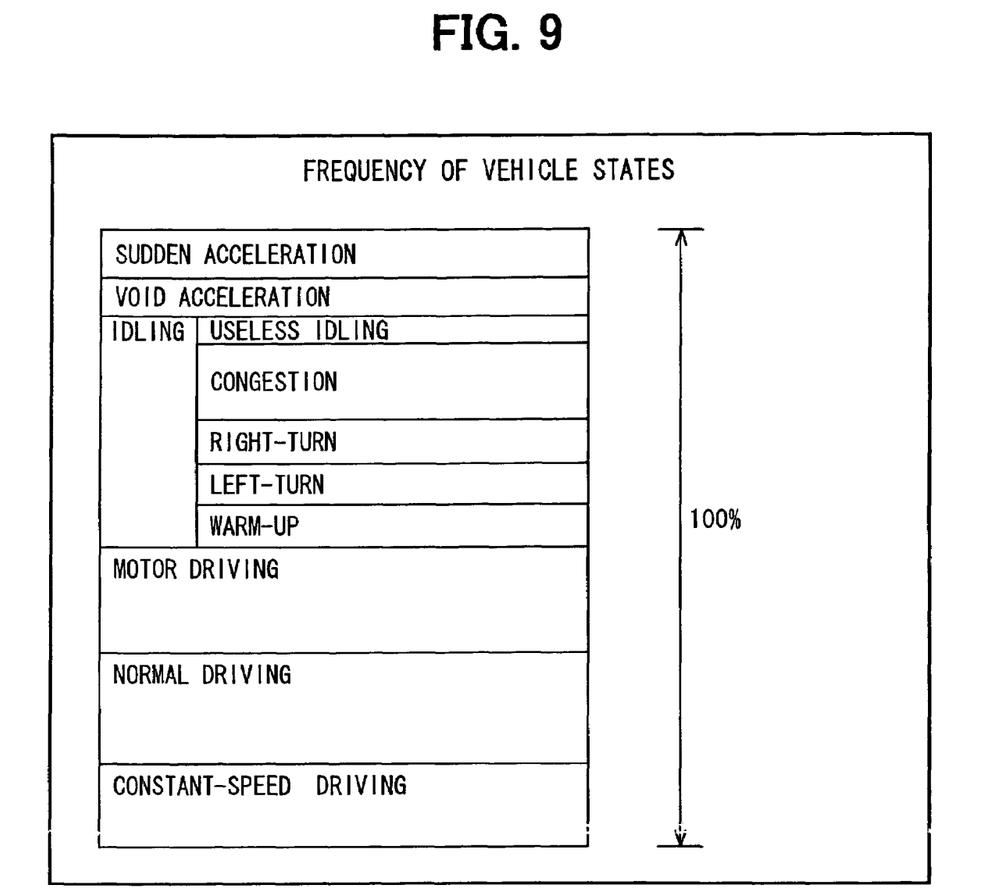
FIG. 9 is a display screen example of illustrating frequencies of vehicle states according to the second embodiment.
Figure 10:
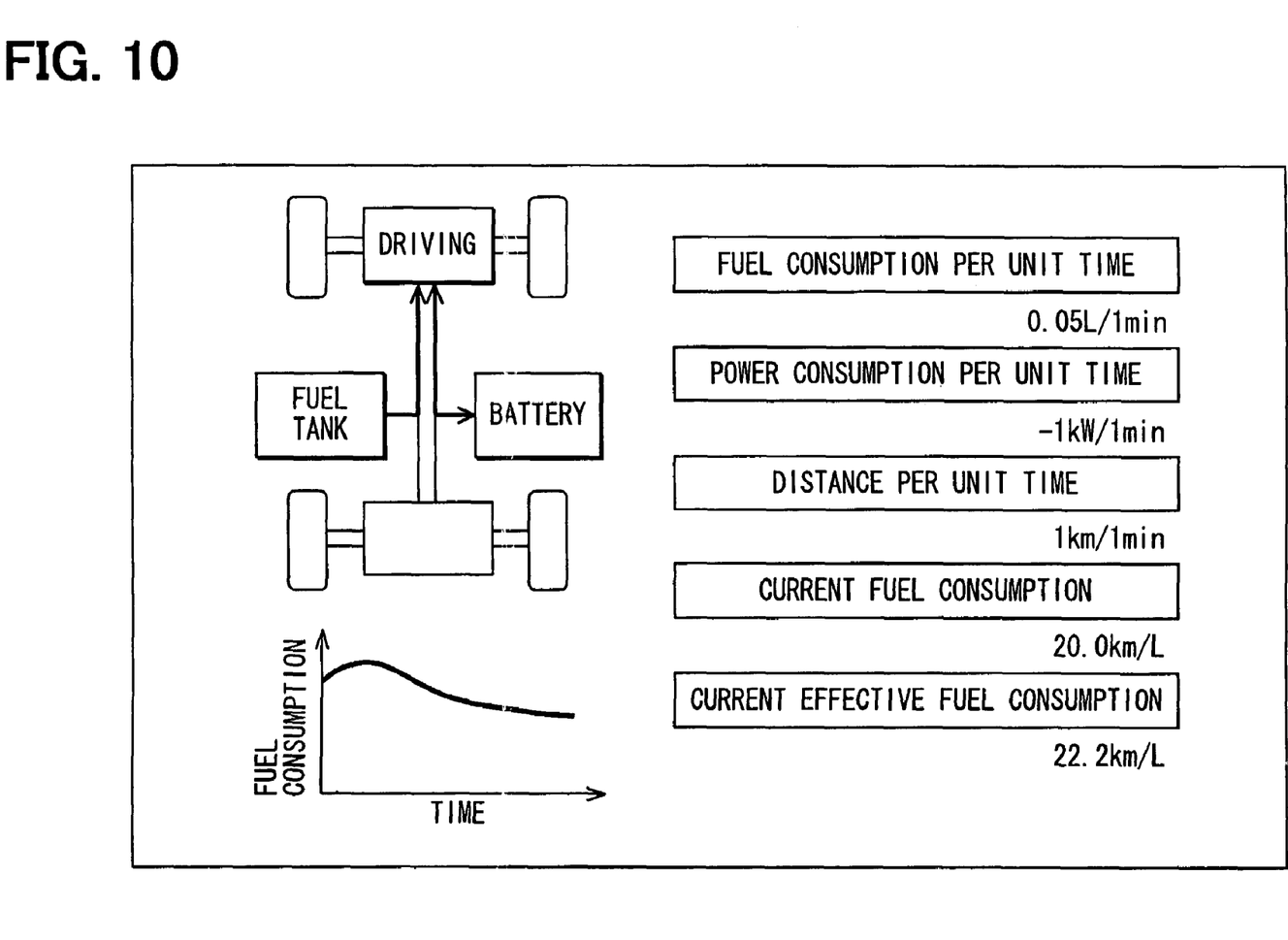
FIG. 10 is a display screen example of illustrating effective fuel consumption according to the second embodiment.

When terminating the detailed idling state determination process, the CPU 22 determines whether or not the battery is charged or discharged (Step S33). When detecting that the battery is charged, the CPU 22 identifies that the battery is charged (Step S34). When detecting that the battery is discharged, the CPU 22 identifies that the battery is discharged (Step S35). The CPU 22 accumulates the number of times the CPU 2 identifies the states as mentioned above. The CPU 22 allows the display apparatus 11 to display a graph as shown in FIG. 9. The graph shows the number of times the CPU 2 identifies each state until the liquid fuel consumption reaches a specified amount. As shown in FIG. 10, the CPU 22 also allows the display apparatus 11 to display the effective fuel consumption in consideration for the amount of battery charge and discharge.

When detecting that the motor is driven, the CPU 22 determines whether or not the vehicle speed is lower than 20 km/h (Step S8). Thereafter, the CPU 22 performs Steps S9 through S11 as mentioned in the first embodiment. The CPU 22 may determine that neither the engine nor the motor is operating (NO at Step S31). In this case, the CPU 22 determines that the engine and the motor stop (Step S36).

The CPU 22 calculates the effective fuel consumption in consideration for the battery charge and discharge as follows. For example, let us consider that the vehicle's fuel consumption is 20.0 km/L using only the liquid fuel. It is assumed that the battery is supplied with 1-W power in a minute and the 1-W power enables a cruising distance of 0.1 km. The fuel consumption needs to be 20.0 km/L for traveling the 0.1 km distance only using the liquid fuel. The required liquid fuel is 0.005 L. When the battery is charged one minute, the 1-W power is equivalent to the liquid fuel of 0.005 L. When the vehicle speed is assumed to be 60 km/h, the travel distance per minute is one kilometer. When the vehicle travels using only the liquid fuel, the liquid fuel consumption is 0.05 L. Accordingly, the effective fuel consumption is calculated as follows.

$$1 \text{ [km]}/(0.05 \text{ [L]} - 0.005 \text{ [L]}) = 22.2 \text{ [km/L]}$$

As mentioned above, the ecological driving system 21 according to the second embodiment distinctively displays the liquid fuel consumption according to the following idling states. One idling state results from the engine warm-up. Another is unnecessary idling state. Still another idling state results when the vehicle waits for turning to the left at an intersection or stops at the roadside. Yet another idling state results when the vehicle waits for turning to the right at an intersection. Still yet another idling state results when the vehicle waits forward at an intersection or stops due to traffic congestion. In addition, the system also displays information about the liquid fuel consumption incorporating the amount of battery charge and discharge. In this case, the amount of battery charge and discharge is converted into the liquid fuel consumption. The system can notify the user of the liquid fuel consumption distinctively in each of the idling states. The system can also notify the user of the information about the liquid fuel consumption incorporating the amount of battery charge and discharge.

OTHER EMBODIMENTS

The invention is not limited to the above-mentioned embodiments but can be modified or enhanced as follows.

The display screen may be embodied otherwise. The notification to the user may be not only visual, but also audible through the use of audio output. The other numeric values may be used for the vehicle speed and the acceleration as criteria for determining whether the vehicle accelerates suddenly, drives normally, or drives at a constant speed.

Displaying the graph is not limited to the time point when the liquid fuel is supplied or when the vehicle reaches the destination. The graph may be displayed periodically or each time the driving finishes or the user gets on or off the vehicle.

The system may identify a user and display information about the liquid fuel consumption for each user.

The system may apply to a vehicle that uses, as a driving source, gas fuel instead of liquid fuel.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An ecological driving system in a vehicle, the ecological driving system comprising:
    state detecting means for detecting states including a first state and a second state of the vehicle;
    computing means for computing (i) first data on a fuel consumption in the first state and (ii) second data on a fuel consumption in the second state; and
    reporting means for reporting the first data and the second data, mutually distinctively,
    wherein the state detecting means uses a vehicle speed, an acceleration, and an opening of an accelerator as criteria to detect states including:
        an idling state, including the first state and the second state, where an engine of the vehicle idles;
        a void acceleration state where the accelerator is opened with the vehicle speed not increased;
        a sudden acceleration state where the vehicle accelerates suddenly:
        a normal driving state where the vehicle drives normally; and
        a constant-speed driving state where the vehicle drives at a constant speed: and
    wherein the computing means computes, with respect to a fuel consumption, data in the idling state, data in the void acceleration state, data in the sudden acceleration state, data in the normal driving state, and data in the constant-speed driving state, and
    the reporting means reports the five computed data, mutually distinctively.

2. The ecological driving system according to claim 1, wherein
    the first state is an idling state of an engine of the vehicle resulting from temporary stopping during vehicle travel, and
    the second state is an idling state of the engine not resulting from temporary stopping during vehicle travel.

3. The ecological driving system according to claim 2, wherein
    the first state resulting from temporary stopping during vehicle travel includes an idling state when the vehicle waits forward at an intersection or stops due to congestion, an idling state when the vehicle waits for turning to left at an intersection, and an idling state when the vehicle waits for turning to right at an intersection.

4. The ecological driving system according to claim 2, wherein
    the second state resulting not from temporary stopping during vehicle travel includes an idling state for engine warm-up and a useless idling state, which takes place not for engine warm-up when the vehicle is outside of a road.

5. The ecological driving system according to claim 1, wherein
    the state detecting means further uses an engine temperature and position information obtained from navigating means, which determines whether the vehicle is on a road, as additional criteria to detect idling states, which are classified into:
        a warm-up idling state for engine warm-up;
        a useless idling state which takes place not for engine warm-up when the vehicle is outside of a road; and an idling state resulting from temporary stopping during vehicle travel, the computing means computes, with respect to a fuel consumption, data in the warm-up idling state, data in the useless idling state, and data in the idling state resulting from temporary stopping during vehicle travel, and the reporting means reports the three computed data, mutually distinctively.

6. The ecological driving system according to claim 1, wherein, when a user specifies beginning and end time points, the reporting means reports data on fuel consumptions in individual states from the user-specified beginning time point to the end time point.

7. The ecological driving system according to claim 1, wherein, when a user uses navigating means to specify a destination, the reporting means reports data on fuel consumptions in individual states detected from a departure place to the destination.

8. The ecological driving system according to claim 7, wherein, after the vehicle reaches the destination, the reporting means reports data on fuel consumptions in individual states detected for a period from when the vehicle departs from the departure place and to when the vehicle reaches the destination.

9. The ecological driving system according to claim 1, wherein the reporting means reports data on fuel consumptions in individual states with respect to each other.

10. The ecological driving system according to claim 1, wherein the computing means converts an amount of battery charge and discharge into a fuel consumption and the reporting means reports data on a fuel consumption incorporating the amount of battery charge and discharge.

11. The ecological driving system according to claim 1, wherein the computing means computes a fuel consumption per unit distance, and the reporting means reports data on the fuel consumption per unit distance in individual states.

12. An ecological driving system in a vehicle, the ecological driving system comprising:

a state detecting unit configured to individually detect, based on at least one of (i) a vehicle speed, (ii) an acceleration, and (iii) an opening of an accelerator, an idling state where an engine of the vehicle idles and a void acceleration state where the accelerator is opened with the vehicle speed not increased;

a computing unit configured to compute first data on a fuel consumption in the idling state and second data on a fuel consumption in the void acceleration state; and a reporting unit configured to report the first data and the second data, mutually distinctively.

13. The ecological driving system of claim 12, wherein:

the state detecting unit is configured to further individually detect:

a sudden acceleration state where the vehicle accelerates suddenly, a normal driving state where the vehicle drives normally, and a constant-speed driving state where the vehicle drives at a constant speed;

the computing unit is configured to further compute third data on a fuel consumption in the sudden acceleration state, fourth data on a fuel consumption in the normal driving state, and fifth data on a fuel consumption in the constant-speed driving state in addition to the first data and the second data; and the reporting unit is configured to further report the third data, the fourth data, and the fifth data such that the first to fifth data are mutually distinctively reported.

14. The ecological driving system of claim 12, wherein:

the reporting unit is further configured to report the data by using colors.

15. The ecological driving system of claim 12, wherein:

the reporting unit is further configured to report the data each time a predetermined time period elapses or each time driving of the vehicle finishes.

16. The ecological driving system of claim 12, wherein:

the reporting unit is further configured to report the data by using an audio output.

17. The ecological driving system of claim 12, wherein:

the reporting unit is further configured to report data on a fuel consumption associated with a user identified.

18. An ecological driving system in a vehicle, the ecological driving system comprising:

a state detecting unit configured to individually detect states including a first state and a second stated based on at least one of (i) a vehicle speed, (ii) an acceleration, and (iii) an opening of an accelerator, the first state being an idling state where an engine of the vehicle idles, the second state being a void acceleration state where the accelerator is opened with the vehicle speed not increased;

a computing unit configured to individually accumulate the detected states in terms of points to thereby compute accumulation values; and a reporting unit configured to report the computed accumulation values.

19. The ecological driving system of claim 18, wherein:

the states individually detected by the state detecting unit further include:

a third state being a sudden acceleration state where the vehicle accelerates suddenly, a fourth state being a normal driving state where the vehicle drives normally, and a fifth state being a constant-speed driving state where the vehicle drives at a constant speed;

the computing unit is configured to further accumulate the detected first to fifth states the in terms of points to thereby compute accumulation values; and the reporting unit is configured to report the computed accumulation values with respect to the first to fifth states.

20. The ecological driving system of claim 18, wherein:

the reporting unit is configured to notify a user of information that an environmentally friendly driving is achieved.

21. The ecological driving system of claim 18, wherein:

the reporting unit is further configured to report the data by using colors.

22. The ecological driving system of claim 18, wherein:

the reporting unit is further configured to report the data each time a predetermined time period elapses or each time driving of the vehicle finishes.

23. The ecological driving system of claim 18, wherein:

the reporting unit is further configured to report the data by using an audio output.

24. The ecological driving system of claim 18, wherein:

the reporting unit is further configured to report data on a fuel consumption associated with a user identified.

25. An ecological driving system in a vehicle, the ecological driving system comprising:
a state detecting unit configured to individually detect states of the vehicle including a first state and a second state;
a computing unit configured to individually compute (i) data on a fuel consumption in the first state and (ii) data on a fuel consumption in the second state; and
a reporting unit configured to report information to allow a user of the vehicle to be conscious of an ecological driving based on (i) the computed data on the fuel consumption in the first state and (ii) the computed data on the fuel consumption in the second state.

* * * * *